United States Patent
Fabozzi et al.

(10) Patent No.: US 9,434,525 B2
(45) Date of Patent: Sep. 6, 2016

(54) IN-MOULD LABELLED CAPSULE FOR BEVERAGE PREPARATION

(75) Inventors: Thierry Jean Robert Fabozzi, Geneva (CH); Delphine Musset, Yverdon-les-Bains (CH); Klaus Wessolleck, Malterdingen (DE); Rafael Mittler, Boswil (CH)

(73) Assignee: Nestec S.A., Vevey (CH)

( * ) Notice: Subject to any disclaimer, the term of this patent is extended or adjusted under 35 U.S.C. 154(b) by 276 days.

(21) Appl. No.: 14/239,573

(22) PCT Filed: Jul. 27, 2012

(86) PCT No.: PCT/EP2012/064754
§ 371 (c)(1),
(2), (4) Date: Feb. 19, 2014

(87) PCT Pub. No.: WO2013/026651
PCT Pub. Date: Feb. 28, 2013

(65) Prior Publication Data
US 2014/0190863 A1    Jul. 10, 2014

(30) Foreign Application Priority Data

Aug. 19, 2011    (EP) ..................................... 11178061

(51) Int. Cl.
*B65D 85/804*    (2006.01)
*B65D 81/18*    (2006.01)
*B65B 29/02*    (2006.01)

(52) U.S. Cl.
CPC .............. *B65D 81/18* (2013.01); *B65B 29/02* (2013.01); *B65D 85/8043* (2013.01)

(58) Field of Classification Search
CPC ............. A47J 31/3623; A47J 31/3676; A47J 31/693; B65D 85/808; B65D 85/8043
USPC ........................ 99/295, 323; 426/77, 78, 115
See application file for complete search history.

(56) References Cited

U.S. PATENT DOCUMENTS 3,833,740 A * 9/1974 Schmidt ............... B65D 85/808
                                                        206/5
4,921,712 A * 5/1990 Malmquist ............ A47J 31/057
                                                        426/110

(Continued)

FOREIGN PATENT DOCUMENTS

| CN | 101332641 | 12/2008 |
| EP | 1472156 | 3/2006 |
| EP | 2236264 | 10/2010 |
| EP | 2284100 | 2/2011 |
| GB | 1348370 | 3/1974 |

(Continued)

OTHER PUBLICATIONS

Japan Office Action for Application No. P2014-525382, Dispatch No. 579809, Dispatch Date Jan. 5, 2016, 6 pages.

*Primary Examiner* — Reginald L Alexander
(74) *Attorney, Agent, or Firm* — K&L Gates LLP (57) ABSTRACT

The present invention concerns a beverage preparation capsule (11) defining a closed chamber for enclosing a mass of soluble and/or extractable food material, for use in a beverage preparation machine, comprising: (i) a capsule body with side walls (12), a bottom wall (13) open with a dispensing opening (14), said capsule body walls comprising an injection-moulded oil-based or biomass-based thermoplastic material, which is not a gas-barrier material, (ii) a gas and moisture impermeable top membrane (15), pierceable by injection means (N) of the machine which are adapted to inject an extraction liquid under pressure inside said chamber, and (iii) a gas and moisture impermeable bottom membrane (16) sealed inside the capsule body near the bottom wall (13), (iv) means (18) adapted to open said chamber by relative engagement with the bottom membrane under the effect of the liquid pressure increase in the chamber during injection of said liquid, characterized in that the inside or outside surface of the capsule body is at least partially covered by a gas-, and optionally moisture-, impermeable label (20) permanently attached by in-mould labelling to said capsule body wall, said label having a tridimensional shape such that the labelled capsule is gas and moisture tight.

10 Claims, 11 Drawing Sheets

(56) References Cited

U.S. PATENT DOCUMENTS

| | | | |
|---|---|---|---|
| 7,279,188 B2 * | 10/2007 | Arrick | B65D 85/8043 426/112 |
| 7,685,930 B2 * | 3/2010 | Mandralis | A47J 31/36 99/295 |
| 8,927,037 B2 * | 1/2015 | Kihnke | B67D 3/0067 426/115 |

FOREIGN PATENT DOCUMENTS

| | | |
|---|---|---|
| JP | 10129737 | 5/1998 |
| JP | 2006123446 | 5/2006 |
| JP | 2007144985 | 6/2007 |
| JP | 2007535332 | 12/2007 |
| JP | 2011515134 | 5/2011 |
| JP | 2011150149 | 8/2011 |

* cited by examiner

IN-MOULD LABELLED CAPSULE FOR BEVERAGE PREPARATION

CROSS REFERENCE TO RELATED APPLICATIONS

The present application is a National Stage of International Application No. PCT/EP2012/064754, filed on Jul. 27, 2012, which claims priority to European Patent Application No. 11178061.5, filed Aug. 19, 2011, the entire contents of which are being incorporated herein by reference.

FIELD OF THE INVENTION

The present invention concerns a capsule for preparing a beverage in a beverage preparation machine, wherein said capsule is produced by in-mould labelling.

BACKGROUND OF THE INVENTION

Beverage preparation machines are well known in the food science and consumer goods area. Such machines allow a consumer to prepare at home a given type of beverage, for instance a coffee-based beverage, e.g. an espresso or a brew-like coffee cup.

Today, most beverage preparation machines for in-home beverage preparation comprise a system made of a machine which can accommodate portioned ingredients for the preparation of the beverage. Such portions can be soft pods or pads, or sachets, but more and more systems use semi-rigid or rigid portions such as rigid pods or capsules. In the following, it will be considered that the beverage machine of the invention is a beverage preparation machine working a rigid capsule.

The machine comprises a receptacle for accommodating said capsule and a fluid injection system for injecting a fluid, preferably water, under pressure into said capsule. Water injected under pressure in the capsule, for the preparation of a coffee beverage according to the present invention, is preferably hot, that is to say at a temperature above 70° C. However, in some particular instances, it might also be at ambient temperature. The pressure inside the capsule chamber during extraction and/or dissolution of the capsule contents is typically about 1 to 6 bar for dissolution products, 2 to 12 bar for extraction of roast and ground coffee. Such a preparation process differs a lot from the so-called "brewing" process of beverage preparation—particularly for tea and coffee, in that brewing involves a long time of infusion of the ingredient by a fluid (e.g. hot water), whereas the beverage preparation process allows a consumer to prepare a beverage, for instance coffee within a few seconds.

The principle of extracting and/or dissolving the contents of a closed capsule under pressure is known and consists typically of confining the capsule in a receptacle of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the extracted substance or the dissolved substance through the capsule. Capsules allowing the application of this principle have already been described for example in applicant's European patent no EP 1 472 156 B1, and in EP 1 784 344 B1.

Machines allowing the application of this principle have already been described for example in patents CH 605 293 and EP 242 556. According to these documents, the machine comprises a receptacle for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand.

The machine further comprises a fluid tank—in most cases this fluid is water—for storing the fluid that is used to dissolve and/or infuse and/or extract under pressure the ingredient(s) contained in the capsule. The machine comprises a heating element such as a boiler or a heat exchanger, which is able to warm up the water used therein to working temperatures (classically temperatures up to 80-90° C.). Finally, the machine comprises a pump element for circulating the water from the tank to the capsule, optionally though the heating element. The way the water circulates within the machine is selected via a selecting valve means, such as for instance a peristaltic valve of the type described in applicant's European patent application EP 2162653 A1.

When the beverage to be prepared is coffee, one interesting way to prepare the said coffee is to provide the consumer with a capsule containing roast and ground coffee powder, which is to be extracted with hot water injected therein.

Capsules have been developed for such an application, which are described and claimed in applicant's European patent EP 1 784 344 B1, or in European patent application EP 2 062 831.

Figure 1:
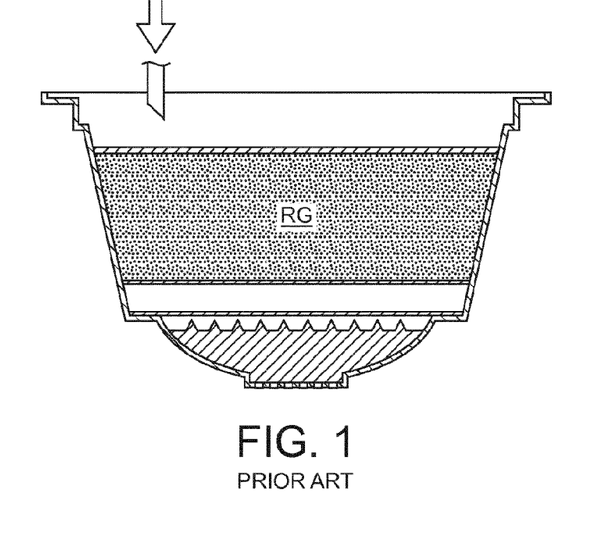
FIG. 1 is a schematic profile cut view of a capsule of the prior art.

In short, such capsules comprise typically, as illustrated in FIG. 1:

- a hollow body and an injection wall which is impermeable to liquids and to air and which is attached to the body and adapted to be punctured by e.g. an injection needle of the machine,
- a chamber containing a bed of roast and ground coffee to be extracted,
- an aluminum membrane disposed at the bottom end of the capsule, closing the said capsule, for retaining the internal pressure in the chamber, the said membrane being associated with piercing means for piercing dispensing holes in the said aluminum membrane when said internal pressure inside the chamber reaches a certain predetermined value,
- optionally, means configured to break the jet of fluid so as to reduce the speed of the jet of fluid injected into the capsule and distribute the fluid across the bed of substance at a reduced speed. It is critical for the user to know when the water level in the machine tank is too low to prepare a full beverage.

The capsule body is a tri-dimensional complex element, comprising at its bottom part a step such that the aluminum membrane described above can be sealed onto the internal surface of said body, as illustrated in FIG. 1.

The capsule body is typically manufactured by thermo-forming a sheet of plastic. In order to protect the capsule contents against gas and moisture degradation during storage, the capsule body is manufactured using a plastic which is generally a laminate comprising at least one gas and moisture barrier layer. Such a technical requirement prevents using an injection-moulding technique, because such an injection moulding technique does not allow the injection of a multilayer body wall.

The aluminum membrane described above provides a good barrier in the lower part of the capsule. And the top pierceable membrane ("injection wall" described above) is made with a gas and moisture impermeable material as well, which can be mono- or multilayer.

As can be understood, all materials are chosen as it is essential to guarantee the capsule be moist and gas barrier to protect its contents.

In-mould labelling (IML) is a label moulding technique used in blow moulded, injection moulded and thermoformed containers. In general an inner layer compatible with the plastic material partially melts to bond to a plastic structure formed inside the injection or thermoforming mould.

In general, the label is placed in the mould wherein it is held in place by vacuum or other dedicated positioning means. The mould is then closed and molten plastic resin is poured or injected into the mould in order to form the packaging container. Thereby, the adhesive of the label is activated due to the heat resulting from the injection of hot resin and thus, the label is adhered to the container, i.e. the label becomes moulded to the container wall.

EP 1440903 refers to a cartridge for the preparation of a beverage with a barrier coating applied by a number of mechanisms including in-mould labelling.

JP 10129737 A for example relates to a packaging container with an opening having oxygen gas barrier properties. Thereby, an inner wall of a side face of a bottomed container main body and an inner wall of a bottom thereof is provided with in-mould labels for improving the oxygen gas barrier properties of the packaging container.

Furthermore, GB 1348370 discloses a container comprising a structure or frame, made of a rigid or semi rigid material, which is used as a support for applying a softer material, like for instance a film by an in-mould labelling technique so as to obtain a container FR 2700493 A is a French patent application that also discloses a container that is made by injecting a rigid frame onto which a label is attached to complete the container body, for instance by in-mould labelling.

Such a IML technique provides advantages industrially, in terms of production rate, practicality, and also as it helps reducing the amount of packaging material that is used, hence being economically, and ecologically friendly.

It is therefore one main objective of the present invention to develop a capsule that can be produced by IML, and a manufacturing process for making it, that provides all the advantages of the IML production cited above, while achieving high gas and moisture protection of the capsule contents.

SUMMARY OF THE INVENTION

The objectives set out above are met with a beverage preparation capsule according to claim 1.

Particularly, the capsule according to the invention is characterized in that the outside surface of the capsule body is at least partially covered by a gas-, and optionally moisture-, impermeable label permanently attached by in-mould labelling to said capsule body wall, said label having a tri-dimensional shape such that the labelled capsule is gas and moisture tight.

In a highly preferred embodiment of the invention, the capsule body walls further comprise a circumferential step directed inwardly, which is located between the side and bottom walls.

Preferably, the label covers the outside surface of the capsule body side walls, and the outside surface of the step, and more preferably, said label covers also the outside surface of the body bottom wall.

It is also highly preferable that the external diameter of the bottom membrane be greater than the inside diameter of the label in the step region, thus creating an overlap ("Op") between the bottom membrane and the label in said step region.

Such an overlap guarantees that no gas or moisture will pass through the capsule body walls, even over a long period of storage.

Advantageously, said overlap can be set between 1 and 3 mm wide.

The capsule body step can be horizontal relative to the vertical symmetry axis of the capsule.

The present invention is also directed to a process for making a beverage preparation capsule as described above, characterized in that it comprises the steps of, in order:

(i) providing a gas and moisture barrier flat label having a general shape of an arc segment, (ii) positioning and then forming said flat label around a punch having a frusto-conical shape, into a frusto-conical label band, (iii) optionally punching the small apex of the label band so as to deform it inwardly and create a step edge (iv) positioning the label band with its step inside a mould and closing the mould, (v) injecting a thermoplastic material inside the mould so as to form a one layer thermoplastic capsule body which is labelled on its outside surface with said label, wherein said capsule body comprises side walls, a bottom wall open with a dispensing opening, and a circumferential step directed inwardly which is located between the side and bottom walls, and such that said label covers the outside surface of the capsule body side walls, and optionally the outside surface of the step portion.

In a highly preferred embodiment of the invention, the label comprises fringes on the smallest edge of the arc segment, so that the punching step bends said fringes inwardly, creating at least partial overlaps between adjacent fringes.

Such fringes will bend toward the inside of the label band during the punching operation, and the tri-dimensional shape will be easier to achieve, due to the flexibility of the fringes, which bend individually. In case the punching operation is performed on a label not having fringes, it was shown that in many instances, the inward step created comprises creases, through which gas and/or moisture can pass, which is of course highly undesirable. When fringes are cut in the flat label, no creases appear when the flat label is then punched into a tri-dimensional frusto-conical label band with a step edge.

In a first embodiment, the fringes can be disposed tangentially perpendicular relative to the edge of the label arc segment.

In a second, preferred, embodiment however, the fringes are disposed tangentially oblique relative to the edge of the label arc segment. Such a configuration has shown particularly good results regarding the reliability of the forming process, when the label is punched to create a step edge. No creases or wrong bending of the fringes has occurred. This is due to the fact that the oblique direction of the fringes one relative to the adjacent others creates a dynamic movement of deformation during punching, wherein all fringes follow the same bending direction such that adjacent fringes overlap naturally one onto the other. This positive effect was proved especially at high production rates.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 2:
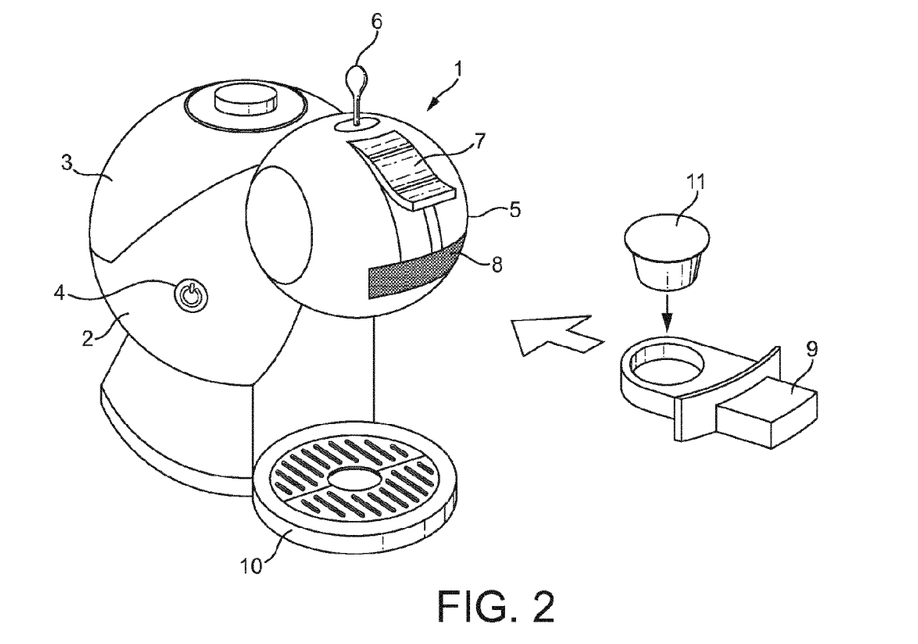
FIG. 2 is a schematic perspective view of a beverage preparation machine for use with a capsule of the invention.

The capsule according to the present invention is meant to be used in a beverage preparation machine 1 as illustrated in FIG. 2.

The machine comprises a machine body 2 containing a water pump, a water heating element and an electronic board for controlling the machine functions, a water reservoir 3, an on/off switch 4, a brewing head 5 which is in fluid communication with the water pump, heating element, and the water reservoir 3. The machine further comprises a temperature lever 6 for the user to select hot or cold beverage preparation. The brewing head 5 comprises a locking latch 7 to lock or release the insertion into an opening 8 of a capsule holder 9. The machine further comprises a cup tray 10.

As illustrated in FIG. 2, the capsule holder 9 is meant to be loaded with a capsule 11. The loaded capsule holder is then inserted into the opening 8 of the brewing head 5, locked thereinto by moving the locking latch 7 downwardly, such that a piercing element (not illustrated) pierces the capsule top wall, in a configuration ready for injection of water inside the capsule, and thus beverage preparation.

Figure 3:
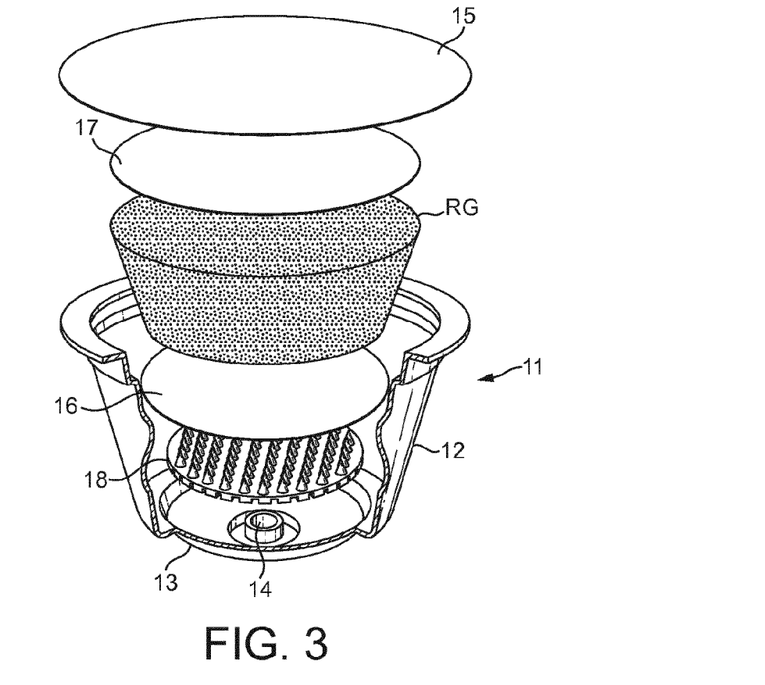
FIG. 3 is a perspective split view, partially cut, of a capsule according to the invention.

As illustrated in FIG. 3, the capsule 11 according to the invention comprises a capsule body with side walls 12 and a bottom wall 13 having a dispensing opening 14. The capsule is hermetically closed after its filling and during storage by a top membrane 15 and a bottom aluminium membrane 16. The top membrane is pierceable by a needle "N" of the beverage preparation machine, said needle being adapted to inject a liquid under pressure inside the capsule in order to extract and/or dissolve beverage preparation ingredients "RG" contained inside said capsule. In case the capsule 11 is filled with a roast and ground extractable coffee powder, a pierced film 17 is sealed on top of the mass of roast and ground coffee, as described in applicant's European patent EP 1784344 B1, in order to maintain the mass of ingredient during injection of liquid inside the capsule. The capsule 11 further comprises means to open the bottom membrane 16 when liquid pressure inside the capsule raises above a certain level. This means is a plate 18 comprising piercing protrusions on its surface which is turned towards the bottom membrane 16.

Figure 4:
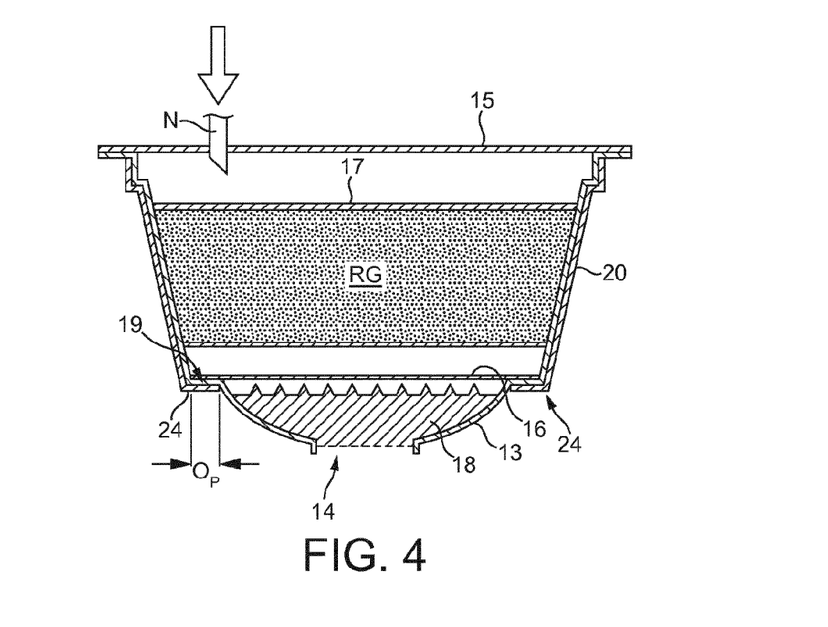
FIG. 4 is a schematic profile cut view of a capsule cording to the invention.

According to the invention, the capsule 11 illustrated in FIG. 4 is manufactured such that the capsule body is a one-piece plain element, made of a polypropylene injection-moulded material. The capsule body further comprises a circumferential step 19 directed inwardly which is located between the side wall 12 and bottom wall 13 of the capsule body. Such a material is not barrier to gas and moisture, and therefore cannot protect the capsule contents during storage. In order to achieve a proper gas and moisture barrier, the invention provides a capsule 11 wherein the body side wall 12 and the step 19 are covered with a label 20 made out of a gas and moisture barrier material, as illustrated in FIG. 4.

More precisely, as illustrated in FIG. 4, the bottom membrane 16 is sealed on the internal surface of the step 19, the label 20 is sealed on the external surface of said step 19, and the external diameter of the bottom membrane is greater than the inside diameter of the label in the step region such that an overlap "$O_p$" between the bottom membrane 16 and the label 20 is created. By "overlap", it is meant a dimensional overlap when considering the capsule in the transverse direction as illustrated in FIG. 4. Such an overlap is not a mechanical overlap as the bottom membrane 16 and the label 20 are not in contact with each other. Such an overlap is important as it ensures that the gas and moisture barrier is effective, as no gas or water vapour molecules can transfer from outside the capsule towards the inside, through said step 19.

The invention is further directed to a process for manufacturing a capsule as described above. Said process will now be described in reference to FIGS. 5 to 10. In the following, only the process steps which relate to the production of the capsule body will be described in detail. Other steps for the production of a fully finished and filled capsule will not be described because they are known as such. Such steps comprise injection moulding the piercing plate 18, and placing the latter into the capsule body, then sealing the bottom membrane 16 onto the internal sides of the step 19, the filling the capsule body with an ingredient, the optionally sealing a pierced film 17, then sealing the top membrane 15 onto the capsule body top edge.

Figure 5:
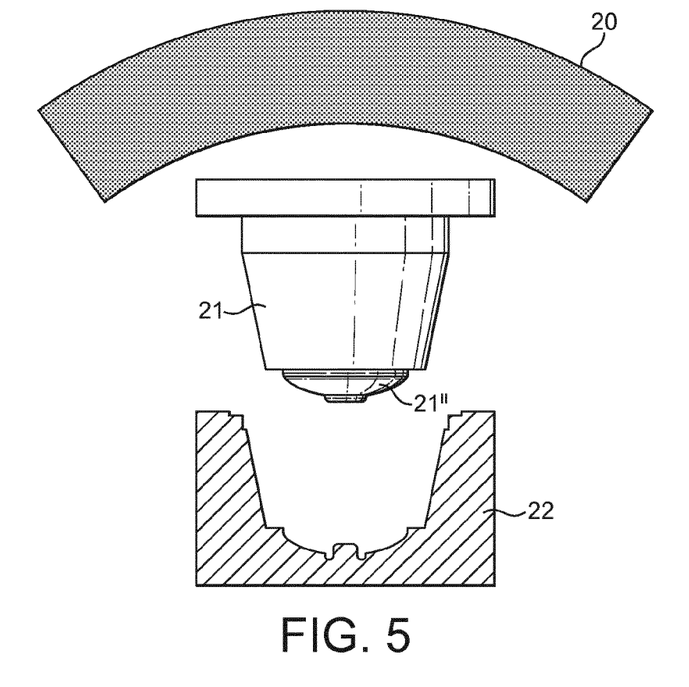
FIGS. 5 to 10 are schematic profile views showing different steps of a process according to the invention.

As illustrated in FIG. 5, the first step of the production of a capsule body according to the invention comprises cutting a flat label 20 from a film roll made of a gas and moisture barrier material. The label thus cut has the general shape of an arc segment as shown in FIG. 5. The label 20 in its flat configuration is then approached from an injection moulding core 21 which has a generally frustoconical shape corresponding to that of the capsule body, and which has the positive shape relative to a corresponding hollow injection moulding cavity 22.

Figure 6:
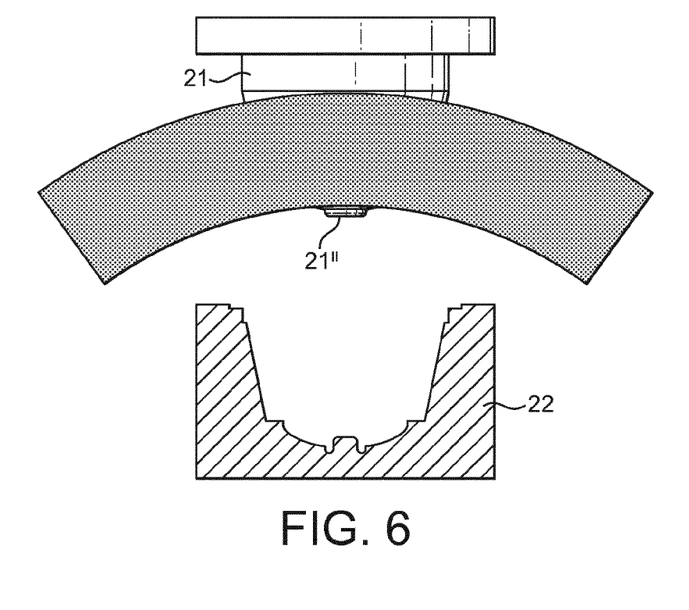
Figure 7:
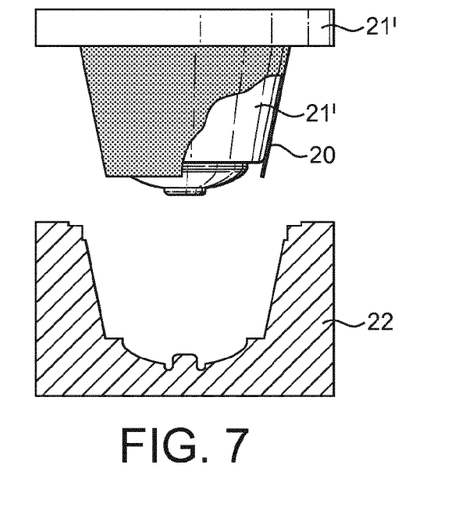
Figure 8:
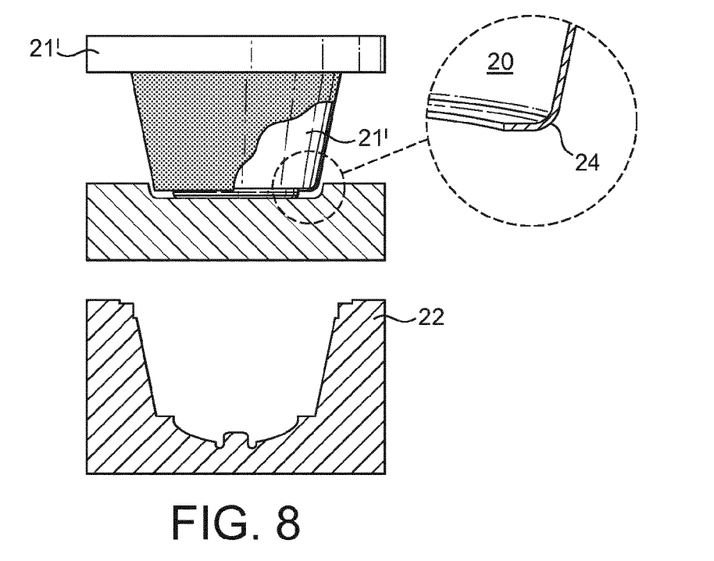

The label is electrostatically charged and therefore it is then removably fixed onto the surface of the metallic core 21, as shown in FIG. 6. As a preferred alternative to using the injection moulding core 21 for forming the label from its flat configuration to its frustoconical shape, an intermediary forming element 21' can be used, which generally has the same shape than that of the injection moulding core 21, but without the protruding bottom shape 21" that moulds the lowermost inner portion of the capsule. Such an intermediate forming element is illustrated in FIGS. 7 and 8, where it replaces the conventional injection moulding core during the label forming process. If such a forming element is used, of course the formed label is then transferred mechanically into the cavity of the injection mould as described hereafter, for injection moulding of the capsule according to the invention. In that case, the injection mould comprises a mould cavity and a mould core as described above and hereafter, and as illustrated for instance in FIGS. 5, 9 and 10.

Then the label 20 is formed around the core 21 or the forming element 21' as illustrated in FIG. 7. This forming step is performed by creating a vacuum at the surface of the core or forming element (in that case, the core or forming element comprises an aspiration system), or alternatively, the label 20 can be formed around the core 21 or forming element 21' by application of mechanical means—not illustrated in the drawing—. In that position, the lower part of the label (which now has a generally cylindrical shape) extends outside of the core, or forming element 21' as shown in the partially cut portion of FIG. 7.

Figure 13:
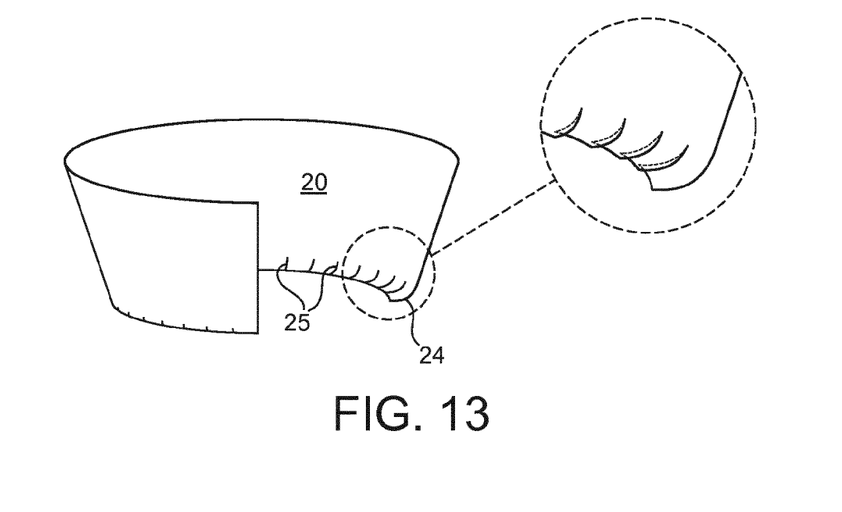
Figure 16:
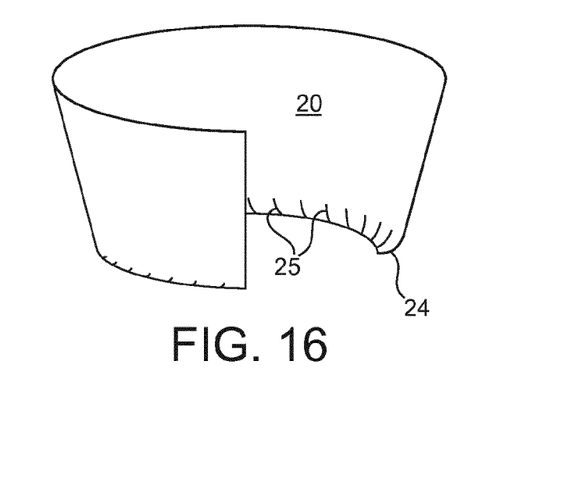

As shown in FIG. 8, the label 20 thus formed and fixed around the core 21 or forming element 21' is then approached to a step-forming punch element 23 which is pressed from below said core 21 or element 21', onto the lower edge of the label 20 which protrudes from the core 21 or element 21'. This deforms said lower edge towards the inside of the label 20, thus creating an inwardly rounded step edge 24, as illustrated in FIG. 8, 13 or 16. This inward step edge 24 is meant to adapt exactly to the step portion 19 of the capsule body as also illustrated in FIG. 4.

Figure 9:
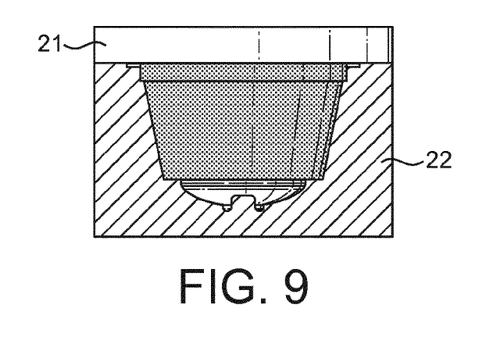
Figure 10:
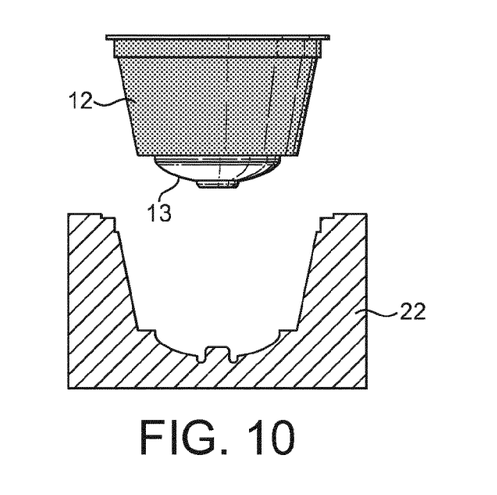

Then, the formed label is transferred into the mould cavity which is closed, as illustrated in FIG. 9, in a configuration of the injection mould, ready for injection of the capsule body plastic part. The injection takes place, such that molten plastic flows between the core 21 and the label 20 (not shown). During injection, the material of the label and the injected plastic are sealed one to the other, such that when the injection mould opens by moving the core 21 out, the label is permanently fixed onto the outside surface of the capsule body, in the region of the side walls 12 and step 19, as illustrated in FIG. 10. The capsule body thus formed is ready for the following capsule-forming steps already described above (assembly with piercing plate 18, sealing of membranes, filling).

In order to ensure that the barrier protection is also efficient and reliable, it is important that no creases are present between the label 20 and the outside surface of the step 19, as such creases would create channels through which gas or moisture molecules may pass, which is of course undesirable.

Figure 11:
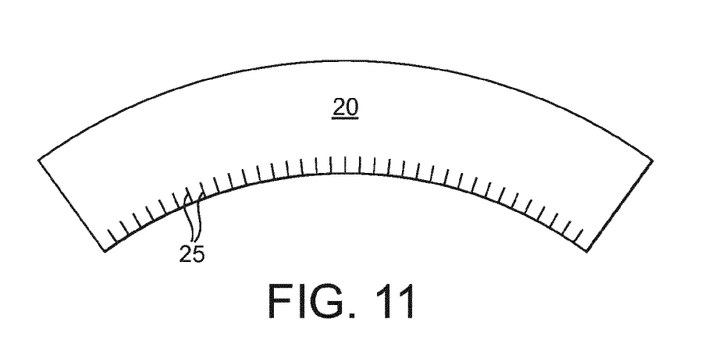
FIGS. 11 to 13 illustrate one embodiment of a label for manufacturing a capsule according to the invention.

The present invention provides an efficient guarantee that such creases will not appear in the thickness of the label 20. To this effect, the label, when in its flat configuration as illustrated in FIG. 11, is manufactured with fringes 25. The fringes are cut along the small arcuate side of the label arc segment.

Figure 12:
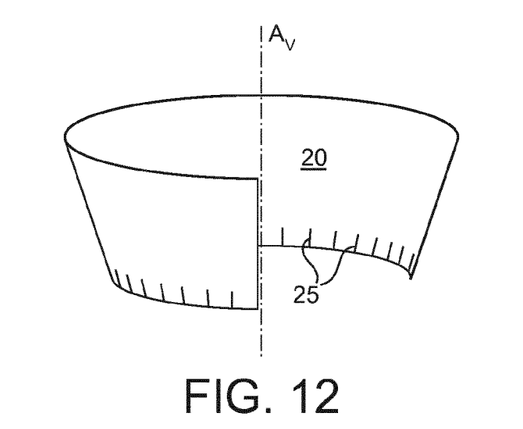

As illustrated in FIG. 12, the fringes can be cut vertically relative to the vertical symmetry axis "$A_v$" of the label when the latter is in its folded configuration.

Such a configuration is efficient in preventing creases, because when bottom inward edge 24 of the label 20 is formed as described above in reference to FIG. 8, the fringes will bend inwardly and due to the reduced diameter of the label thus formed, from the outside towards the inside, adjacent fringes stay flat and only overlap one onto the other as shown in the enlarged part of FIG. 13. This prevents an erratic deformation of the label material in this region which would cause creases.

Figure 14:
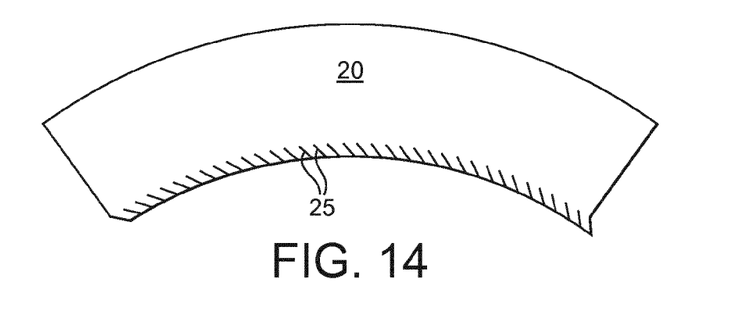
FIGS. 14 to 16 illustrate one embodiment of a label for manufacturing a capsule according to the invention.
Figure 15:
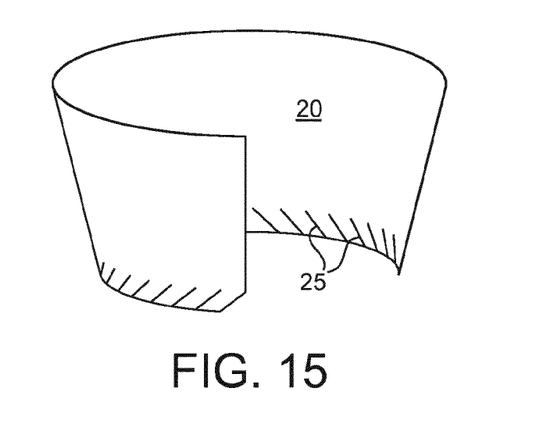

It was surprisingly found that in order to further improve the reliability of the process according to the invention, the fringes 25 can be cut such as to be disposed tangentially oblique relative to the small arcuate edge of the label arc segment, as illustrated in FIGS. 14, 15, and 16. In this case, it was found that the placing of fringes during inward deformation of the inward edge 24 is improved and the position of each fringe relative to the adjacent ones occurs naturally. FIG. 14 illustrates such a label 20 with oblique fringes 25 in its flat configuration. FIG. 15 shows the same label after being formed around the core element of the injection mould. And FIG. 16 illustrates the same formed label after punching of the lower edge of the label inwardly to form the edge 24 which corresponds to the step portion 19 of the capsule body.

In order to produce a capsule according to the present invention, an alternative manufacturing process can be used, which will now be described in detail. With this manufacturing process, the label is not assembled to the outside of the capsule body, but on the inside, as will be described hereafter, with reference to FIGS. 17 to 24.

Figure 17:
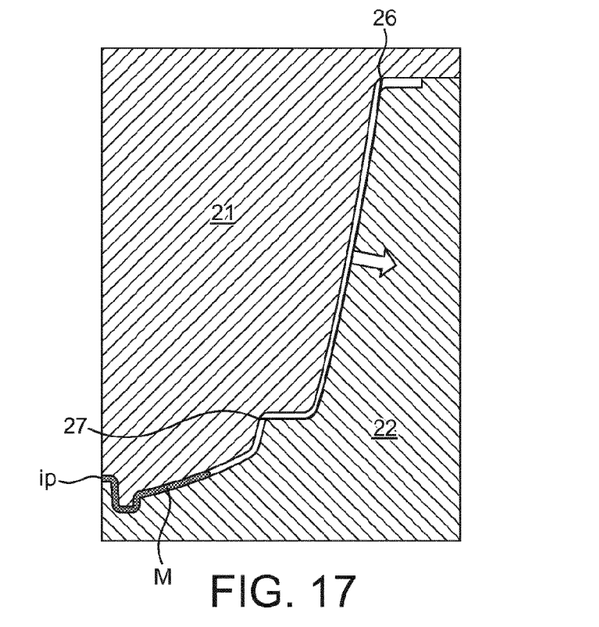
FIGS. 17 to 24 are schematic partial cut side views of a injection moulding process for a making a capsule according to one embodiment of the present invention, illustrating the various steps of thermoplastic injection of the capsule body within the mould.

The forming steps of the label 20 are the same as previously described. The label is provided as a flat element, and it is then given a tridimensional shape by forming around for instance a forming element 21' as illustrated in FIGS. 7 and 8 for example. Once the label is formed, it is transferred into the injection mould cavity 22. The injection is then closed by moving the injection moulding core 21 towards the cavity 22, so as to obtain a closed injection mould as illustrated in FIG. 9 or 17. During the injection of thermoplastic material in the mould, said material "M" is injected through an injection point "IP" that is located at the lowermost end of the capsule, as shown in FIG. 17. The thermoplastic material which is in a molten, thus fluid, state, flows upwardly to the top end of the capsule, as illustrated with a dark thick line in FIGS. 17 to 24. The movement of the thermoplastic material in the mould cavity is illustrated by an arrow in FIG. 18.

Figure 18:
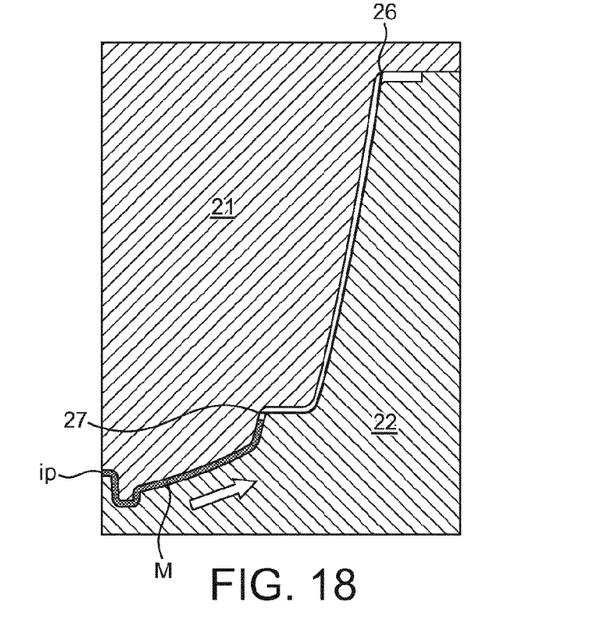

As shown in FIGS. 17 and 18, the uppermost end portion 26 of the label 20 has an additional length so that it extends through the width of the mould cavity. The label 20 is maintained towards the outer mold side by electrostatic charge or vacuum.

As it comprises fringes, the label is folded so that it also extends through the width of the mould cavity in its lowermost end 27.

Figure 19:
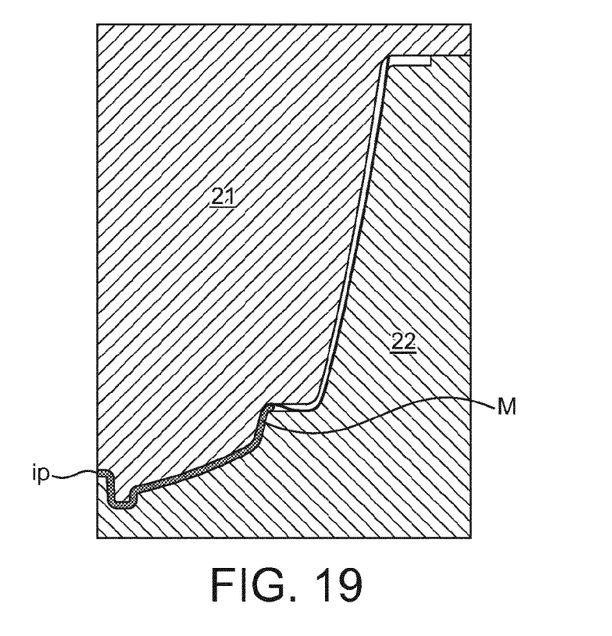

As shown in FIG. 19, the molten thermoplastic then enters in contact with the lowermost end 26 of the label 20, at an angle comprised between 0° and 60° relative to the vertical. The first contact point between the molten plastic material "M" and the label 20 is the fringes 25 of the label. These fringes 25 are moved from the mould cavity 22 toward the core 21 of the injection mold, and the label 20 is held in place in that position by the injected plastic material which presses said label from below, as shown in FIG. 19.

Figure 20:
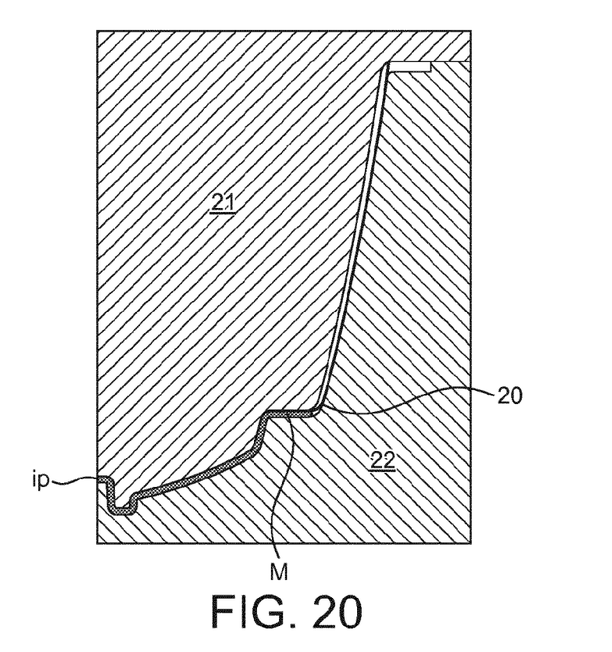

As shown in FIG. 20, as the injection of additional molten thermoplastic continues, the upwardly directed flow of plastic material "M" displaces the rest of the label 20 against the core 21 of the injection mould.

Figure 21:
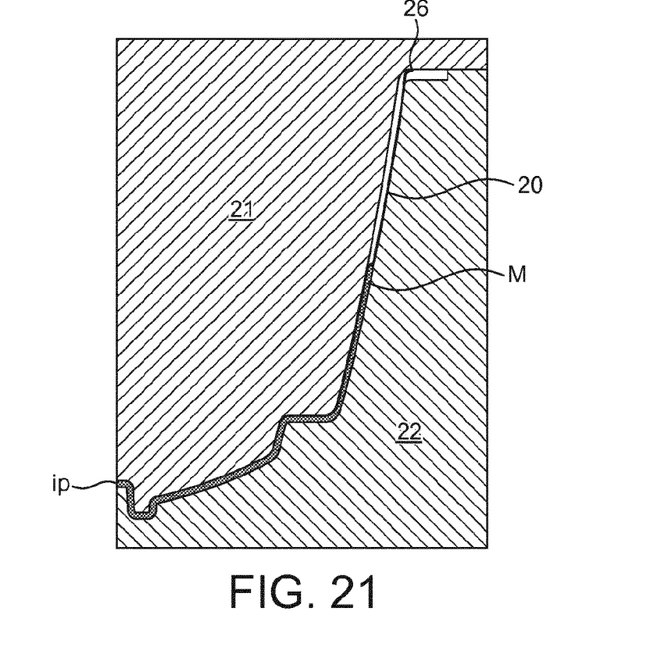
Figure 22:
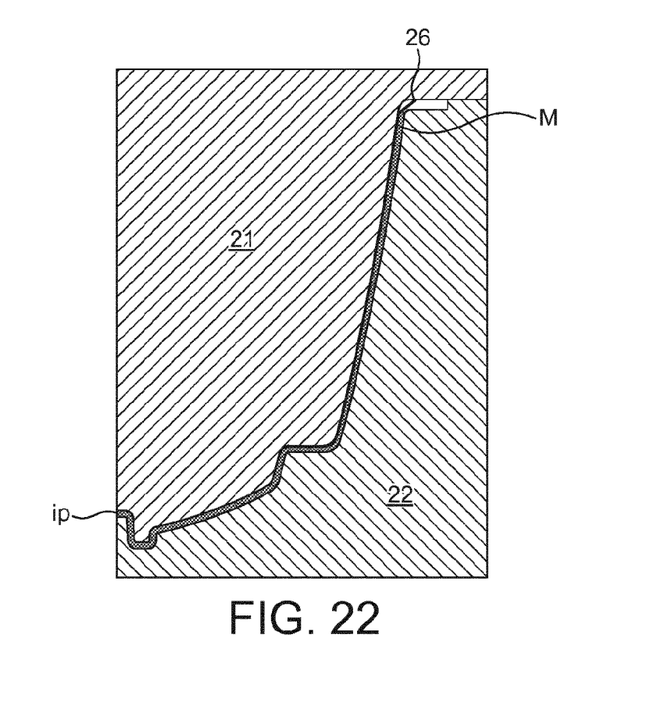

As shown in FIGS. 21 and 22, as the label moves from a larger section of the injection mould to its smaller, inner, section, extra length is available at the uppermost end 26 of said label, which will increase the length of the capsule flange that is covered with said label, as well as for back seal overlap.

Figure 23:
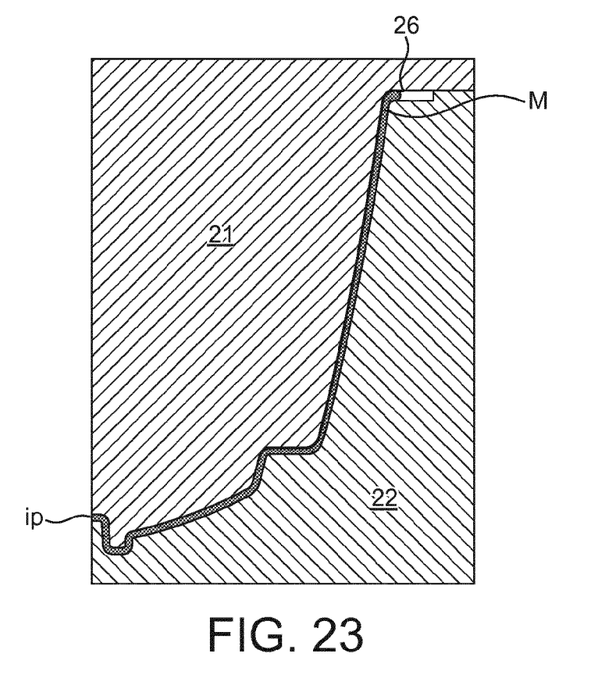
Figure 24:
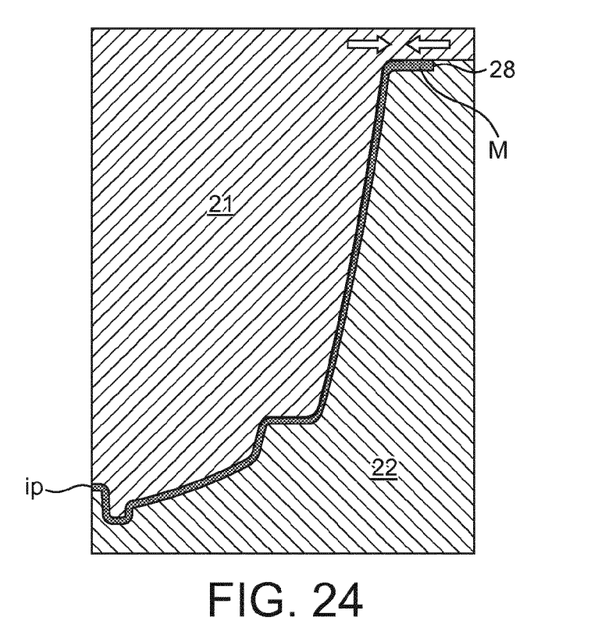

In FIGS. 23 and 24, finally the molten thermoplastic moves the extra label length 26 onto the radius of the capsule flange 28, under pressure and temperature. The length of the uppermost end 26 of the label 20 in this area is sufficient to allow said label to extend and cover the inner surface of the capsule body in the horizontal flange section 28 as well, where the sealing of the capsule top membrane 15 will be performed after product filling. This creates an overlap between the label 20 located at the upper surface of the capsule top flange, and the top membrane that closes the capsule, thus providing a perfect barrier to oxygen between the closing membrane and the barrier label.

As shown in FIG. 24, an overlap is created at the top portion of the inner label, with the top membrane that will then be applied to close the capsule. The overlap portion is illustrated with arrows.

In the alternative process described above in reference to FIGS. 17 to 24, the label preferably comprises fringes 25 as described before.

In all previously mentioned embodiments, it is possible to start injection of the molten plastic in the mould in an off-centered location relative to the axial symmetry axis of the capsule, i.e. typically in a location away from the radial central point of the capsule bottom. This will ensure a proper and controlled transfer of the label from the mold cavity to the core cavity.

From this off-centered injection point and the resulting preferred injection flowpath, the label edges will position themselves relative to the flow of molten plastic that flows within the mould, such as to ensure that said label will properly move from the mould cavity portion where it is first attached (as illustrated for instance in FIG. 18) towards the core portion of the mould (as illustrated in FIGS. 19 to 22).

Finally, it should be noted that the barrier top membrane 15, the bottom membrane 16, and the label 20 can be made each of a gas-tight, and preferably moisture-tight material chosen within the list of: ethylene vinyl alcohol (EVOH), silicium oxide (SiOx), aluminium oxide (AlOx), aluminium, or metalized plastic, or a combination thereof. The materials of this list can also be associated to plastic films made of polypropylene (PP), polyethylene (PE), polyethylene terephtalate (PET), polyethylene naphthalate (PEN), polylactic acid (PLA), or a combination thereof, to create laminated barrier films.

Such laminated barrier films include for instance—but are not limited to—EVOH/PP, PET/SiOx/PP, PET/AlOx/PP, PET/Aluminium/PE.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A beverage preparation capsule defining a closed chamber for enclosing a mass of soluble and/or extractable food material, for use in a beverage preparation machine, comprising:
   a capsule body comprising capsule body walls comprising side walls, the capsule body walls further comprising a bottom wall having a dispensing opening, the capsule body walls comprising an injection-moulded oil-based or biomass-based thermoplastic material, selected from the group consisting of: polypropylene (PP), polyethylene (PE), polystyrene (PS), polycarbonate (PC), polyethylene terephtalate (PET), and polylactic acid (PLA);
   a gas and moisture impermeable top membrane, pierceable by an injection member of the machine which is adapted to inject an extraction liquid under pressure inside the chamber;
   a gas and moisture impermeable bottom membrane sealed inside the capsule body near the bottom wall; and
   a member adapted to open the chamber by relative engagement with the bottom membrane under the effect of the liquid pressure increase in the chamber during injection of the liquid;
   the inside or outside surface of the capsule body is at least partially covered by a gas-impermeable label permanently attached by in-mold labelling to the capsule body wall, the label having a tri-dimensional shape such that the labelled capsule is gas and moisture tight,
   the capsule body walls comprise a circumferential step directed inwardly, which is located between the side and bottom walls,
   the external diameter of the bottom membrane is greater than the inside diameter of the label in the circumferential step, creating an overlap between the bottom membrane and the label in the circumferential step.

2. The capsule according to claim 1, wherein the label covers the outside surface of the capsule body side walls, and the outside surface of the step.

3. The capsule according to claim 1, wherein the label covers the outside surface of the capsule body side walls, the outside surface of the step, and the outside surface of the body bottom wall.

4. The capsule according to claim 1, wherein the overlap is between 1 and 3 mm wide.

5. The capsule according to claim 1, wherein the step is horizontal relative to the vertical symmetry axis of the capsule.

6. A process for making a body of a beverage preparation capsule comprising the steps of:
   providing a gas and moisture barrier flat label having a general shape of an arc segment;
   positioning and then forming the flat label around a core having a frusto-conical shape, into a frusto-conical label band;
   positioning the label band inside a mold and closing the mold; and
   injecting a thermoplastic material inside the mold so as to form a one layer thermoplastic capsule body which is labelled with the label, wherein the capsule body comprises side walls, a bottom wall open with a dispensing opening, and such that the label covers the inside or outside surface of the capsule body side walls.

7. The process according to claim 6, further comprising punching a small apex of the label band to deform the label band inwardly and create an inward step edge.

8. The process according to claim 7, wherein the label comprises fringes on the smallest edge of the arc segment, so that the punching bends the fringes inwardly, creating at least partial overlaps between adjacent fringes.

9. The process according to claim 8, wherein the fringes are located tangentially perpendicular relative to the edge of the arc segment.

10. The process according to claim 8, wherein the fringes are located tangentially oblique relative to the edge of the arc segment.

* * * * *